United States Patent [19]

Seconi et al.

[11] Patent Number: 5,638,370
[45] Date of Patent: Jun. 10, 1997

[54] STATUS BIT CONTROLLED HDLC ACCELERATOR

[75] Inventors: Mark Seconi, Phoenix; Paul McAllister, Chandler, both of Ariz.; Glenn Lewis, Fair Oaks, Calif.

[73] Assignee: Intel Corporation, Santa Clara, Calif.

[21] Appl. No.: 365,356

[22] Filed: Dec. 28, 1994

[51] Int. Cl.$^6$ ....................................... H04T 3/06
[52] U.S. Cl. .................... 370/466; 370/474; 395/200.17; 371/37.7
[58] Field of Search ................. 370/79, 82, 94.1, 370/99; 371/53, 37.1, 37.7; 395/180, 200.15, 200.16, 200.17, 200.18

[56] References Cited

U.S. PATENT DOCUMENTS

| | | | |
|---|---|---|---|
| 4,979,169 | 12/1990 | Almond et al. | 370/99 |
| 5,226,173 | 7/1993 | Sasaki et al. | 395/800 |
| 5,307,355 | 4/1994 | Lauck et al. | 371/37.1 |
| 5,361,374 | 11/1994 | Sasaki et al. | 395/800 |

FOREIGN PATENT DOCUMENTS 0192139  8/1986  Japan ......................... 370/79

*Primary Examiner*—Alpus H. Hsu
*Assistant Examiner*—Seema S. Rao
*Attorney, Agent, or Firm*—Blakely, Sokoloff, Taylor & Zafman

[57] ABSTRACT

A status bit controlled HDLC accelerator comprises a fully programmable CRC generation circuit, a partial data packet formatting/unformatting capability and a dual-mode register set. The HDLC accelerator includes a set of registers that can be written to and read from directly via a bus interface circuit. Moreover, these registers may be written to and read from at any time so that the state of the HDLC accelerator during a formatting or unformatting operation may be stored in mid-operation. The HDLC accelerator further includes a CRC generation circuit that can perform various checkword generation functions in response to a programmable CRC generator polynomial. In addition, programmable counters within the HDLC accelerator allow partial data packets to be processed which thereby enables formatting and unformatting data packets of all valid bit enumerations.

26 Claims, 8 Drawing Sheets

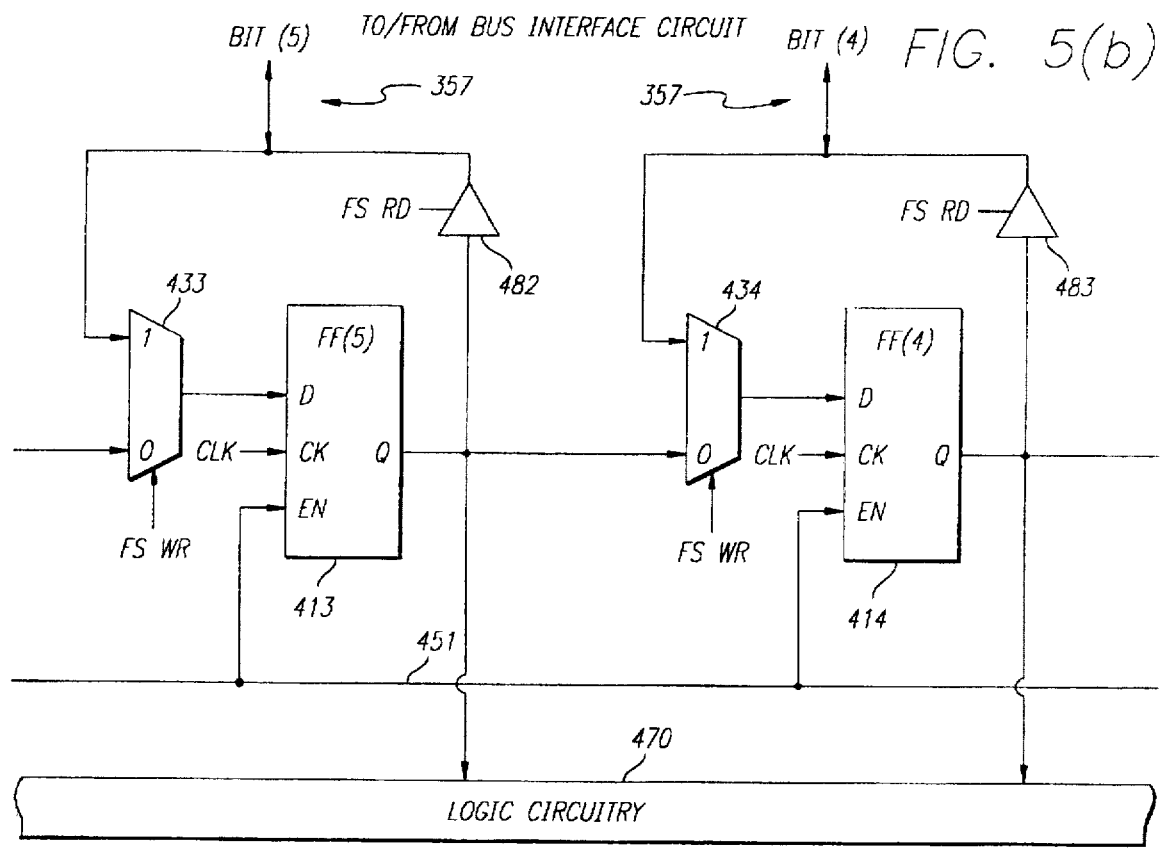
FIG. 5(b)
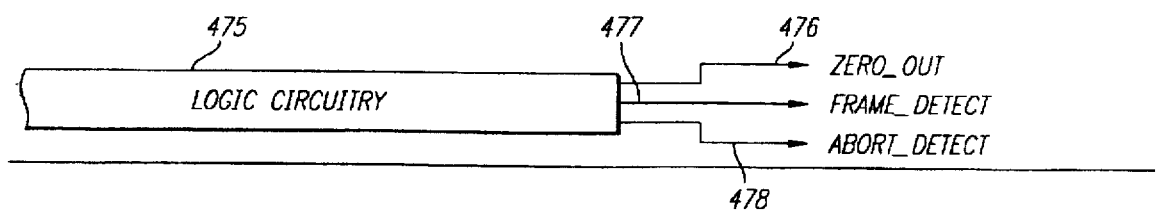

STATUS BIT CONTROLLED HDLC ACCELERATOR

BACKGROUND OF THE INVENTION

1. Field of the Invention

The present invention relates to the field of data communications. More particularly, the present invention relates to a high level data link control ("HDLC") accelerator comprising a fully programmable CRC generation circuit, a partial data packet formatting/unformatting capability and a dual-mode register set wherein the HDLC accelerator is being controlled through status notification.

2. Background Art Related to the Invention

Over the last few decades, modems have been used to enable two remotely located sources (e.g., computer systems) to communicate with each other over standard telephone lines. Typically, a modem includes a signal processing system which formats (i.e., encodes) outgoing digital data from a local source and unformats (i.e., decodes) incoming digital data from a remote source. Normally, a conventional HDLC accelerator is implemented within the signal processing system to perform these formatting and unformatting operations in accordance with a well-known HDLC protocol referred to as "zero insertion" and "zero deletion", respectively. As a result, the conventional HDLC accelerator enables a processing unit of the computer system to execute more computationally intensive instructions instead of performing HDLC formatting and unformatting operations. Moreover, designed for performing HDLC-specific algorithmic tasks, the conventional HDLC accelerator minimizes formatting and unformatting time thereby enhancing the overall efficiency and capability of the signal processing system. Although the conventional HDLC accelerator apparently offers several advantages, it also affords a number of disadvantages.

One disadvantage is that conventional HDLC accelerators employ separate formatting and unformatting register sets. The use of separate formatting and unformatting register sets is somewhat repetitive because both register sets perform many identical operations. Thus, for a signal processing system implemented on a single integrated circuit, multiple register sets unnecessarily waste area and increase the device count i.e., the overall number of transistors, required by the HDLC accelerator. An HDLC accelerator that could both format and unformat data using the same register set is therefore desirable.

Moreover, conventional HDLC accelerators typically utilize interrupts in transmitting data to and receiving data from the processing unit. To service these interrupts, the processing unit incurs software overhead i.e., a processor executed control operation requiring the processing unit to (i) save to memory its current state before HDLC data transmission or retrieval and (ii) restore this saved state after HDLC data transmission or retrieval has completed so that the processing unit may continue its pre-HDLC operation. These interrupts adversely impact the performance of the signal processing system especially if the time required to perform the software overhead is relatively large compared to the time actually required by the HDLC formatting and unformatting operation.

In addition, due to the necessity of an interrupt scheme, the conventional HDLC accelerator employs (i) interrupt assertion circuitry which indicates a need for HDLC data transmission or retrieval and (ii) data buffer circuitry (e.g., FIFOs) which stores outgoing data until the processing unit responds to a transmit interrupt request, and incoming data when the processing unit responds to a receive interrupt request. To overcome performance degradation caused by the above-described interrupts, the data buffer circuitry provides large storage capacities. However, this further increases the device count which may diminish the number of transistors available to implement other types of circuits in the signal processing system. Thus, an HDLC accelerator which minimizes the impact to system performance and eliminates the use of both the interrupt assertion circuitry and data buffer circuitry is desirable.

Besides providing HDLC formatting and unformatting, the conventional HDLC accelerator often generates a Cyclic Redundancy Checkword ("CRC or CRC checkword") which is used to check that no errors have occurred in the HDLC data transmission or retrieval over standard telephone lines. The use of CRCs is widely known in the art, with several established standards for data communication protocols. Typically, conventional HDLC accelerators perform a CRC generation function based on a single, specific CRC generator polynomial. Such a constraint limits the number of applications which can be performed by the signal processing system. This, in turn, limits the overall flexibility and reduces marketability of the signal processing system. An HDLC accelerator which can be programmed to generate a CRC based upon any existing or yet to be created CRC generator polynomial is therefore desirable as it provides the flexibility to enter new applications or markets without redesigning CRC generation circuits.

Lastly, the conventional HDLC accelerator typically does not allow formatting and unformatting of partial data packets (i.e., bytes having <8 valid bits and words having <16 valid bits). This also places a constraint on the number of applications which can be performed by the signal processing system and, as a result, limits marketability. Thus, it is desirable to provide an HDLC accelerator that attains the flexibility of formatting and unformatting data packets of all valid bit enumerations.

BRIEF SUMMARY OF THE INVENTION

The present invention is a status bit controlled HDLC accelerator having a fully programmable CRC generation circuit, a partial data packet formatting/unformatting capability and a dual-mode register set. The HDLC accelerator includes a set of registers that can be written to and read from directly via a bus interface circuit and a CRC generation circuit that can perform various checkword generation functions in response to a programmable CRC generator polynomial. The HDLC accelerator utilizes a plurality of status bits, namely an Input Buffer Full bit and an Output Buffer Empty bit, to indicate that the HDLC accelerator is ready to receive data or has data to be transmitted. Programmable counters within the HDLC accelerator allow partial data packets to be processed which thereby enables formatting and unformatting data packets of all valid bit enumerations. Data is stored, formatted, and unformatted using an identical register set with interconnect paths configured in one of two manners as controlled by a Send-Receive Mode status bit. All registers within the HDLC accelerator may be written to and read from at any time so that the state of the HDLC accelerator during a formatting or unformatting operation may be stored in mid-operation. This allows the state of the HDLC accelerator to be restored after one operation has been interrupted so that a second operation can be performed.

BRIEF DESCRIPTION OF THE DRAWINGS

The objects, features and advantages of the present invention will become apparent from the following detailed description of the present invention in which:

FIGS. 5A–5C are block diagrams collectively illustrating one embodiment of the HDLC formatter circuit of FIG. 4.

DETAILED DESCRIPTION OF THE INVENTION

A status bit controlled HDLC accelerator having a fully programmable CRC generation circuit, a partial data packet formatting/unformatting capability and a dual-mode register set is described below. In the following description, various signals, circuits and configurations are provided in detail. It will be apparent, however, to one reasonably skilled in the art that such details are not necessary to practice the present invention. Additionally, various systems, circuits, and interfaces are described in block form and certain well-known elements, devices, process steps and the like are not set forth in order to avoid unnecessarily obscuring the present invention.

In the detailed description, certain terms frequently are used to describe and represent various logic components, bit representations and signal values described herein. For example, a "register" is defined as a temporary storage element possibly having calculation or shifting capabilities. With respect to bit representations, a "packet" is defined as a plurality of information bits, such as a byte (8 bits), a word (16 bits), a dword (32 bits) and the like. A "frame" is a sequence of packets arranged in a chosen configuration. In connection with signals and signal lines, the terms "assert" or "set" are normally representative of and interpreted by integrated circuit gates and other electronic logic as a logic level "1" having a voltage normally between 3–5 Volts, inclusive. Similarly the terms "de-assert" or "clear" are normally representative of and interpreted by integrated circuit gates and other electronic logic as a logic level "0" having a voltage normally between 0–2 Volts, inclusive. The assertion and deassertion of signals is, of course, by design choice.

Figure 1:
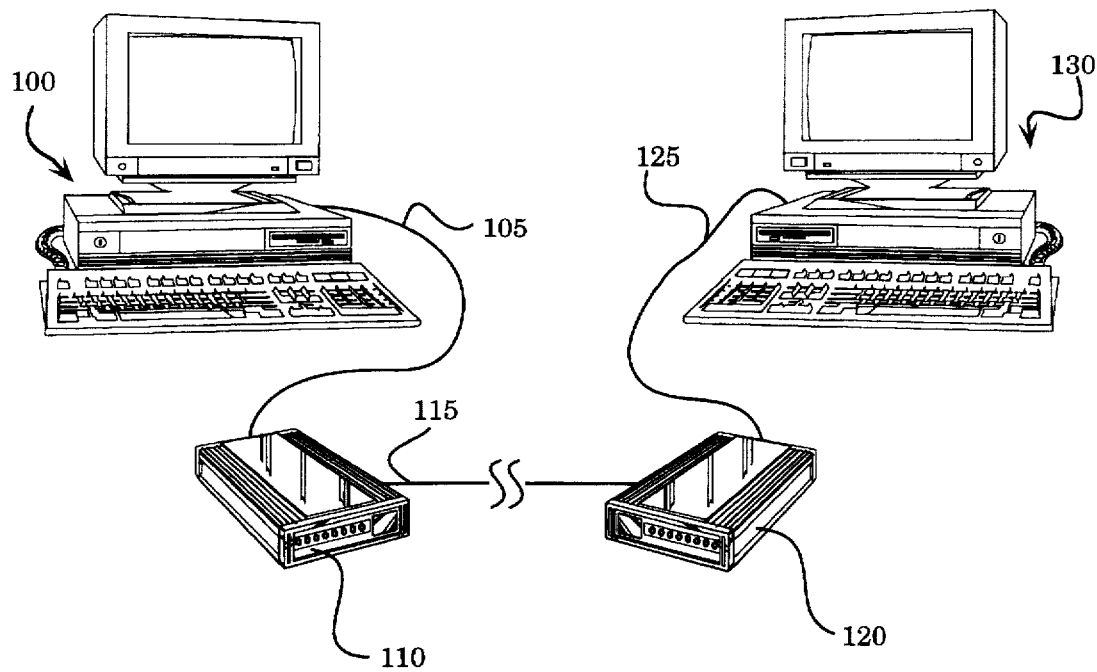
FIG. 1 is a perspective view of a first computer system which remotely communicates with a second computer system through modems connected to a standard phone line.

Referring to FIG. 1, an illustrative embodiment of two computing sources (e.g., a computer) communicating via their corresponding modems employing the present invention is shown, although it is contemplated that the present invention may be implemented onto a modem card within the computing source. A first computing source 100 generates digital data and transmits the digital data through a transmission line 105 to a modem 110. Upon receipt of the digital data, the modem 110 formats this outgoing digital data in accordance with a well known HDLC protocol producing an "HDLC frame".

Figure 2:
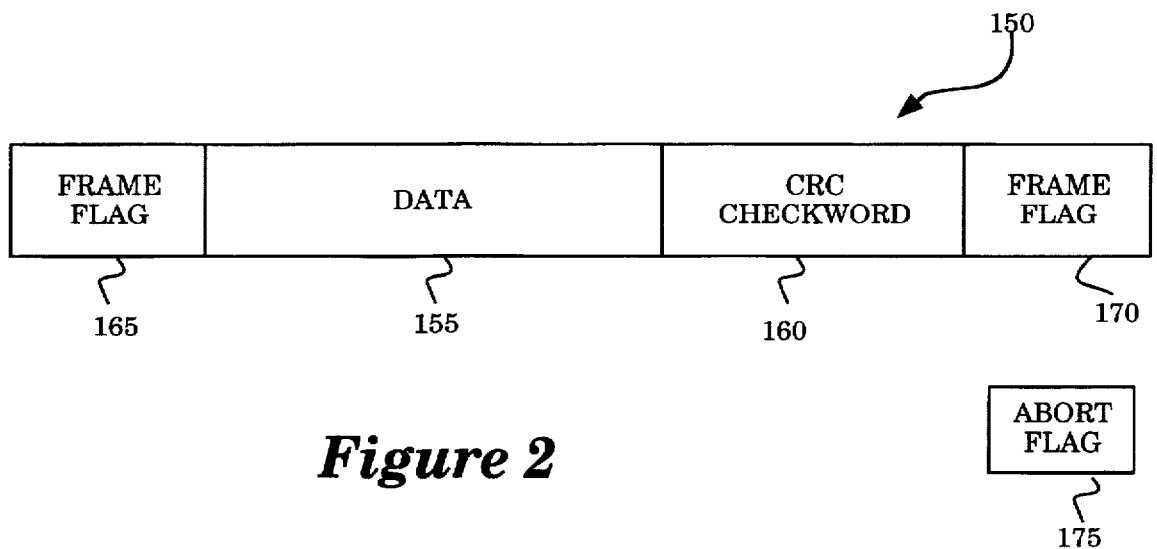
FIG. 2 is a bit representation of one embodiment of an HDLC frame including packets of data and a CRC checkword placed in series between a pair of frame flags.

As shown in FIG. 2, the HDLC frame 150 includes packets of data 155 and a CRC checkword 160 placed in series between a pair of frame flags 165 and 170. The frame flag 165 or 170 is a predetermined bit pattern specified by the HDLC protocol to identify the beginning and end of the HDLC frame 150 or to serve as a time-fill character between HDLC frames. For example, the frame flag 165 and 170 may be represented as a series of six consecutive bits having logic "1" between a pair of logic "0s" (i.e., "01111110"). The abort flag 175 is a different predetermined bit pattern indicating the HDLC frame is invalid because an unusual condition, such as data is not available in time from memory, has occurred during data transmission. The abort flag 175 may be represented by at least seven bits of logic "1" in succession (e.g., "11111110") and may occur anywhere within the HDLC frame.

Referring back to FIG. 1, the modem 110 converts the HDLC frame into an analog signal targeted for a specific element (e.g., a second modem 120) and transmits the analog signal usually over standard telephone lines 115. Remotely located from the first computing source 100, the second modem 120 receives this analog signal from the standard telephone lines 115 and converts the analog signal back into the HDLC frame. The second modem 120 then unformats the HDLC frame to produce the digital data originally generated by the first computer source 100. The second modem 120 transmits the digital data over a transmission line 125 to a second computing source 130.

Figure 3:
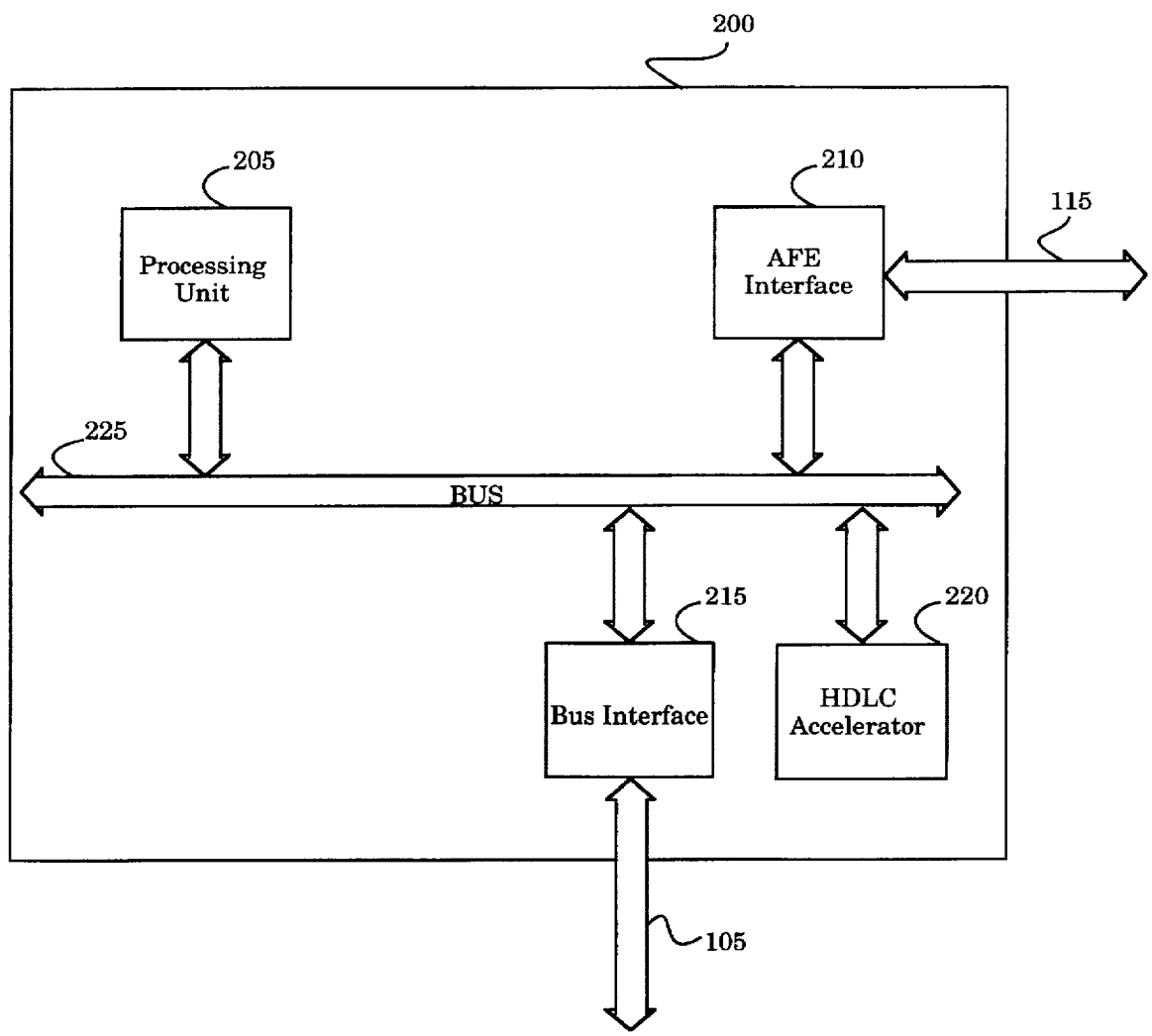
FIG. 3 is a block diagram of an illustrative embodiment of a signal processing system including an HDLC accelerator implemented onto an integrated circuit within a modem.

Referring now to FIG. 3, a block diagram of a signal processing system implemented onto an integrated circuit within the modem 110 of FIG. 1 is shown. As indicated, the signal processing system 200 is responsible for formatting outgoing digital data according to the HDLC protocol and unformatting incoming HDLC frames upon receipt. The signal processing system 200 comprises a processing unit 205, an analog front end ("AFE") interface 210, a bus interface 215 and an HDLC accelerator 220, all of which are coupled together through a bus 225. The bus interface 215 receives the digital data packet generated by the first computing source through transmission line 105 and transmits the same through the bus 225 to the processing unit 205. The processing unit 205 then writes this digital data packet into the HDLC accelerator 220. Unlike a conventional HDLC accelerator that serially receives and transmits data bit-by-bit, the present invention receives and transmits data packets since the processing unit operates exclusively with data packets.

After receiving the digital data packet, the HDLC accelerator 220 converts the same into a serial bit stream, formats the bit stream in accordance with the HDLC protocol and converts the bit stream back into a digital data packet. The processing unit 205 then retrieves the formatted data packet from the HDLC accelerator 220 and inputs the same to the AFE interface 210 which is an interface between the modem 110 and the analog standard telephone line 115 of FIG. 1. Thereafter, the AFE interface 210 transmits the data packet to the second modem over the standard telephone lines 115. A similar signal processing system in the second modem (not shown) receives the data packet via its AFE interface and processes it in reverse of the preceding data flow description where its HDLC accelerator unformats the data packet into the original digital data. The bus interface of the second signal processing system then transmits the digital data to the second computing source 130 through the transmission line 125 of FIG. 1. This process is repeated until an HDLC frame of FIG. 2 is transmitted from the first computing source to the second computing source.

Figure 4:
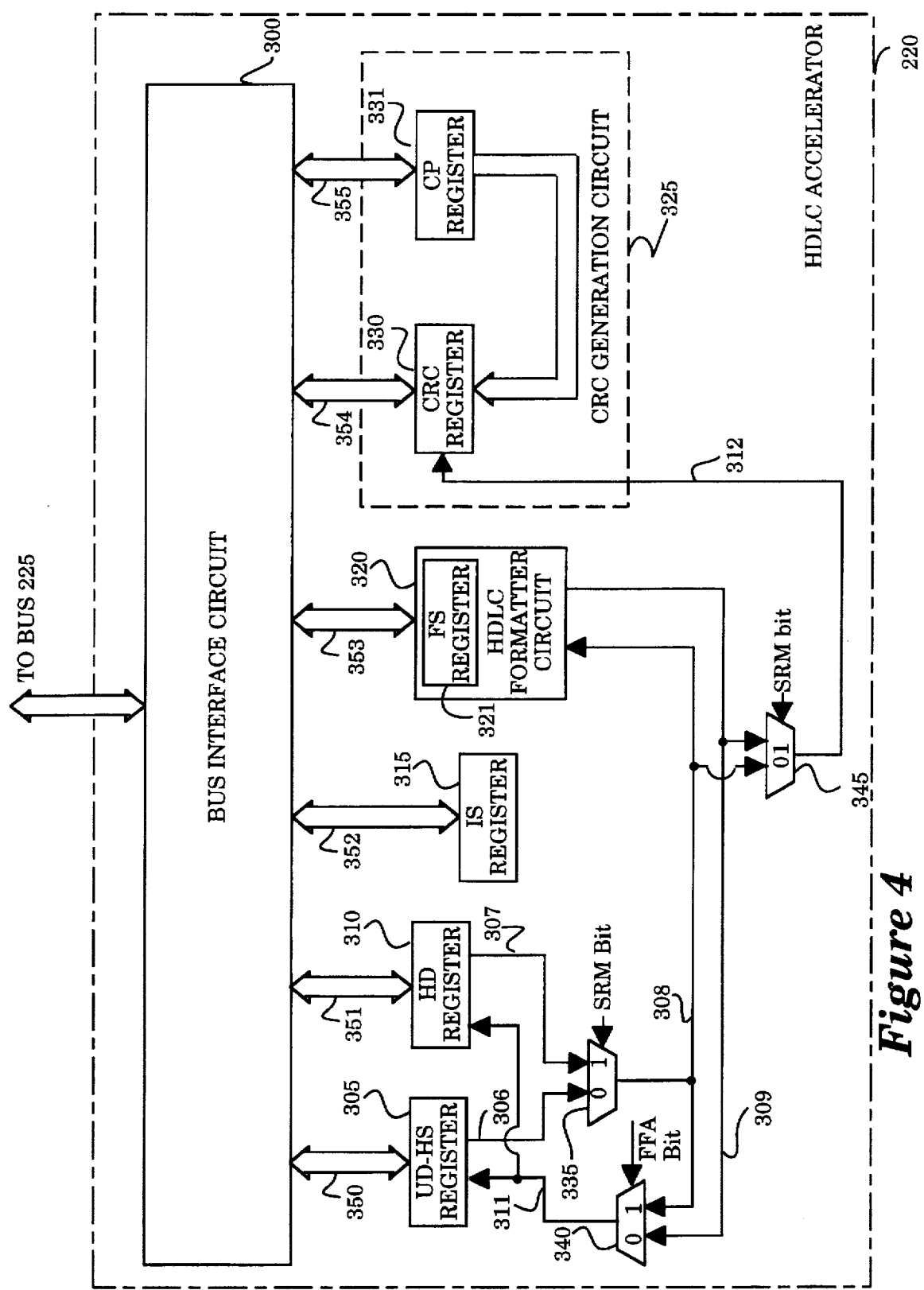
FIG. 4 is a block diagram of an illustrative embodiment of the HDLC accelerator of FIG. 3 including a bus interface circuit and a dual-mode register set including a plurality of registers, an HDLC formatter circuit and a CRC generation circuit.

Referring now to FIG. 4, a block diagram of the HDLC accelerator 220 of FIG. 3 is shown. Generally, the HDLC accelerator 220 may operate in one of two modes referred to as "Send" mode and "Receive" mode, respectively. In "Send" mode, the HDLC accelerator 220 is configured to format data according to the HDLC protocol. Correspondingly, in "Receive" mode, the HDLC accelerator 220 is configured to unformat an incoming HDLC frame. The HDLC accelerator 220 can be programmed to perform either mode at any time.

More specifically, the HDLC accelerator 220 comprises a bus interface circuit 300 which provides the only interconnect the HDLC accelerator 220 has to the data, address, read and write signals of the signal processing system. The bus interface circuit 300 also enables data to be transmitted between the bus 225 and a dual-mode register set being a plurality of registers and circuits coupled together to perform formatting and unformatting tasks required of the HDLC accelerator 220. These registers and circuits include a User Data-HDLC Status ("UD-HS") register 305, an HDLC Data ("HD") register 310, an Internal Status ("IS") register 315, an HDLC formatter circuit 320 containing a Formatter Status ("FS") register 321 and a programmable CRC generation circuit 325 including a CRC register 330 and a CRC Polynomial ("CP") register 331. Each of these registers or circuits may be written to and read from the bus interface circuit 300.

As shown in FIG. 4, since incoming data packets are written into the UD-HS register 305 during "Send" mode and data packets from an incoming HDLC frame are written into the HD register 310 during "Receive" mode, both the UD-HS and HD registers 305 and 310 are coupled to a first dual-input multiplexer 335 through a first and second interconnect lines 306 and 307, respectively. These interconnect lines 306 and 307 enable either the UD-HS or HD registers 305 or 310 to serially transmit data written therein to the first multiplexer 335. A chosen interconnect path is selected by asserting or deasserting asserting Send-Receive Mode ("SRM") bit located in the UD-HS register 305. In the present embodiment, the SRM bit is logic "0" if the HDLC accelerator 220 is in "Send" mode and logic "1" if in "Receive" mode.

In "Send" mode, the data written to the UD-HS register 305 is serially shifted to the first multiplexer 335, preferably least significant bit ("LSB") first until the UD-HS register 305 is empty, causing the HDLC accelerator 220 to cease processing. The first multiplexer 335 allows the data to be transferred along a third interconnect line 308 directly into the HDLC formatter circuit 320, a second dual-input multiplexer 340 and a third dual-input multiplexer 345.

The HDLC formatter circuit 320 formats the data according to a well-known "zero insertion" technique and outputs the bit stream into the second dual-input multiplexer 340 through a fourth interconnect line 309. The second multiplexer 340 allows the bit stream to propagate into the HD register 310 through a fifth interconnect line 311 since a Frame Flag Address ("FFA") bit within the IS register 315 is typically a logic "0" with one exception. The exception being when the data, typically a frame flag or an abort flag, is written to the UD-HS register 305 via the Frame Flag ("FF") address, discussed in reference to Table A. In this case, the data directly propagates into the HD register 310 from the UD-HS register 305 such that no formatting (i.e., zero insertion) or CRC generation is performed on the data.

The third multiplexer 345, coupled to the third and fourth interconnect lines 308 and 309, receives as input the output of the first multiplexer 335 and the output of the HDLC formatter circuit 320. In "Send" mode, the SRM bit selects the third multiplexer 345 to output data from the first multiplexer 335 directly into the CRC register 330 through a sixth interconnect line 312.

In "Receive" mode, similar to the above data propagation, the data written to the HD register 310 is serially shifted to the first multiplexer 335, preferably LSB first until the HD register 310 is empty, causing the HDLC accelerator 220 to cease processing. The first multiplexer 335 is selected by the SRM bit to allow the data to propagate to the HDLC formatter circuit 320, the second dual-input multiplexer 340 and the third dual-input multiplexer 345.

The HDLC formatter circuit 320 unformats the data according to a "zero deletion" technique commonly known in the art. After such unformatting, the HDLC formatter circuit 320 transmits the unformatted data to the UD-HS register 305 through the second multiplexer 340 via the fourth and fifth interconnect lines 309 and 311. In "Receive" mode, the SRM bit selects the third multiplexer 345 to output data from the HDLC formatter circuit 320 into the CRC register 330 through the sixth interconnect line 312.

In addition to unformatting HDLC frames in "Receive" mode, the HDLC formatter circuit 320 also detects when a frame flag is encountered and whether an abort flag exists in the HDLC frame. Frame flag detection frequently occurs since a bit stream will contain many frame flags being used to identify the beginning and end of an HDLC frame and to serve as time-fill characters between HDLC frames. However, abort flag detection will only occur on occasion since abort flags notify that the HDLC frame is to be invalidated due to problematic transmission.

The above register set and circuitry serve to perform both HDLC formatting and unformatting operations as opposed to having a separate register set for each operation. As illustrated by bus lines 350-355, each register and circuit can be written to and read from the bus interface circuit 300 so as to store into or restore from memory the status of the HDLC accelerator 220 during a format or unformat operation. This allows the HDLC accelerator 220 to switch between format and unformat operations as demanded by a data communication protocol.

To facilitate employment of a dual-mode register set, the UD-HS register 305 and the HD register 310 have multiple addresses by which read and write transactions can be performed. The result of such a transaction depends on the address used for the transaction. Table A lists the HDLC accelerator registers, their associated functions and example addresses.

TABLE A

| Example Address (in hex) | Addressed Register Function | Physical Register |
| --- | --- | --- |
| C0h | Frame Flag ("FF") | UD-HS |
| C2h | User Data ("UD") | UD-HS |
| C4h | HDLC Status ("HS") | UD-HS |
| C6h | HDLC Data ("HD") | HD |
| C8h | Save HDLC Data ("SD") | HD |
| CAh | CRC Generation ("CRC") | CRC |
| CCh | CRC Polynomial ("CP") | CP |
| CEh | Internal Status ("IS") | IS |
| D0h | Formatter Status ("FS") | FS |

Even though the UD-HS register 305 is physically only one register preferably being 16-bits divided into high and low order bytes, the UD-HS register is associated with three addresses as shown in Table A. The first of these addresses is the Frame Flag ("FF") address. In "Send" mode, writing to the UD-HS register 305 via the FF address causes the FFA bit within the IS register 314 to be asserted (i.e., logic "1"). This, in turn, causes that data to be transferred directly into the HD register 310, thus bypassing the HDLC formatter circuit 320 and the CRC register 330 as shown in FIG. 4. Frame and abort flags are written to the HDLC accelerator 220 in this manner as they are not to be formatted nor to have CRC generation based upon them pursuant to the HDLC protocol. The FF address is not used in "Receive" mode.

The second address associated with the UD-HS register 305 is the User Data ("CUD") address. In "Send" mode, data to be formatted is written via this address to ensure that the data is sent to both the HDLC formatter circuit 320 and the CRC register 330. In "Receive" mode, this address serves to read unformatted data based on the incoming HDLC frame from the HDLC accelerator.

Both the FF and UD addresses only permit the low order byte of the UD-HS register 305 to be written. This prevents overwriting the contents of the HDLC accelerator status bits located in the high order byte of the UD-HS register. However, a "read" via these addresses provides all 16-bits so that these status bits in the high order byte can be tested.

Reading and writing to the UD-HS register 305 via the FF and UD addresses affect the HDLC accelerator status bits. Because the register set supports dual mode operations, it is desirable to store or restore the state of the UD-HS register 305 without affecting the status bits. Therefore, the HDLC Status ("HS") address, the final address associated with the UD-HS register 305, is provided to read data from and write data into the UD-HS register 305 without affecting the status bits. The HS address is used for switching between "Send" and "Receive" modes and for testing the status bits. It is noted, however, that the write itself will overwrite any current value existing in the high and low order bytes of the UD-HS register 305.

One possible bit representation of the UD-HS register 305 of FIG. 4 is shown in Table B. The low order byte, namely bits [7:0], serves as the data input buffer (i.e., register) during "Send" mode and as a data output buffer during "Receive" mode. In "Send" mode, the UD-HS register's low order byte converts 8-bit data packets to be formatted into a serial bit stream where the LSB (i.e., bit 0) is shifted out first. In "Receive" mode, it converts a serial bit stream of unformatted data into 8-bit data packets to be read by the processing unit 205 of FIG. 3.

flag detection. Thus, it is only necessary to check these bits if the Abort or Frame status bit is set as discussed below. After the abort or frame flag is read from the UD-HS register, the MB2-MB0 status bits are cleared.

The SRM status bit is used to place the HDLC accelerator in "Send" mode or "Receive" mode by writing either a logic "0" or a logic "1" respectively therein. Such writing is performed via the HS address. It is noted that the SRM status bit is the only status bit requiring manual assertion or de-assertion as it determines the operating mode of the HDLC accelerator. All other status bits are asserted or de-asserted automatically based upon the current state of the HDLC accelerator.

The OBF status bit, when set to a logic "1", indicates that the output register is full and data processing is stopped. In "Send" mode, the output register is the HD register 310 and in "Receive" mode the output register is the low order byte of the UD-HS register 305. To resume processing by clearing the OBF status bit, the appropriate output register must be emptied. To prevent the CRC value from changing at the end of an unformatting operation so that it can be used for error checking, the OBF status bit will not be cleared during the first read of the UD-HS register 305 if the Frame status bit (discussed below) is set. Thus, processing will remain halted. On the second read of the UD-HS register 305, the OBF status bit is cleared and processing will resume.

The IBE status bit, when set to logic "1", indicates that the input register is empty and data processing is stopped. The input register must be loaded again to clear this bit and resume processing. In "Send" mode, the input register is the low order byte of the UD-HS register 305 and the bit is cleared when a write is performed with either the FF address or the UD address. In "Receive" mode, the input register is the HD register 310. This bit is the only status bit automatically set to a logic "1" when the HDLC accelerator 220 is reset. This prevents the HDLC accelerator 220 from processing immediately after reset before data is written to it.

The final two bits are the Abort and Frame status bits. In "Send" mode, the Abort and Frame status bits have no meaning. However, in "Receive" mode, if the Abort status bit is asserted (i.e., logic "1"), it indicates that an abort flag of seven or more sequential logic "1s" was detected. This bit is cleared when the frame flag is detected and loaded into the UD-HS register 305. Moreover, if the Frame status bit is asserted, it indicates that a frame flag consisting of a logic

TABLE B

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| Frame | Abort | IBE | OBF | SRM | MB2 | MB1 | MBo | D7 | D6 | D5 | D4 | D3 | D2 | D1 | D0 |

The HDLC accelerator status bits reside in the high order byte of the UD-HS register, namely bits [15:8]. A status bit provides information on the current state of the HDLC accelerator and may govern the operation of the HDLC accelerator as well. Among these status bits includes Missing Bits ("MB2-MB0"), Send-Receive Mode ("SRM"), Output Buffer Full ("OBF"), Input Buffer Empty ("IBE"), Abort and Frame.

With respect to the MB2-MB0 status bits, they are used to store the number of bits missing from the previous received byte. Normally, these three status bits will be logic "0"; however, if in "Receive" mode and a non-byte aligned abort or frame flag is received, the MB2-MB0 status bits will indicate the number of bits missing from the byte prior to "0", six sequential logic "1s" and a logic "0" (i.e., "01111110") exists in the UD-HS register 305. When the frame flag is read from the UD-HS register 305, this bit is cleared.

Referring still to FIG. 4, the HD register 310 is preferably a 16-bit register whose bit representation is shown in Table C. In "Send" mode, it serves as the data output buffer converting a serial bit stream of formatted data into 16-bit data packets to be read by the processing unit 205 (see FIG. 3). In "Receive" mode, it serves as the data input buffer converting 16-bit data packets to be unformatted into a serial bit stream where the LSB is shifted out first.

TABLE C

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| D15 | D14 | D13 | D12 | D11 | D10 | D9 | D8 | D7 | D6 | D5 | D4 | D3 | D2 | D1 | D0 |

Similar to the UD-HS register 305, the HD register 310 has a second, equivalent address so as to not affect the HDLC accelerator status bits during a store or restore of the state of the HDLC accelerator. This second address associated with the HD register 310 is the Save HDLC Data ("SD") address. It allows a read or write of the HD register 310 without affecting the status bits and is used when switching between "Send" and "Receive" modes.

Table D is a possible 16-bit representation of CRC register 330 located in the CRC generation circuit 325 of FIG. 4. This register 330 is a hardware implementation of the CRC generation algorithm where it receives a serial bit stream of data not having inserted zeros and calculates a CRC checkword based upon a programmable CRC generation polynomial. When its calculation is complete, the checkword is read from the HDLC accelerator 220 as a 16-bit data packet and used to determine whether the transmission or retrieval of data by the HDLC accelerator 220 was free of errors.

the HDBC bits will be shifted in as the new HD register value. This partial word is then read on (he next HD register read. In "Receive" mode, a partial word can be unformatted by first programming the HDBC bits with the number of bits to be unformatted before loading the HD register 310. When the HD register 310 is loaded, only the number of bits specified in the HDBC bits will be unformatted.

TABLE F

| 15 | 14 13 12 11 10 | 9 | 8 | 7 | 6 5 4 | 3 2 1 0 |
|---|---|---|---|---|---|---|
| WISR | X X X X X | FRMDET | ABRDET | FFA | UDBC | HDBC |

Bits [6:4] contain the user data bit count ("UDBC") bits which also operate as a down counter, but they reset to zero whenever the low order byte of the UD-HS register 305 as the input register is empty or as the output register is full. A partial byte can be formatted in "Send" mode by first programming the UDBC bits with the number of bits to be

TABLE D

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| C15 | C14 | C13 | C12 | C11 | C10 | C9 | C8 | C7 | C6 | C5 | C4 | C3 | C2 | C1 | C0 |

Unlike the other registers in the HDLC accelerator 220, the CRC register 330 is written and read in a reversed bit manner such that the high order bit is read into the low order line of the bus interface circuit 300 of FIG. 4 and vice versa. This bit reversal appropriately orders the CRC checkword for inclusion into the HDLC frame such that bit 15 will be transmitted first.

The CRC generation circuit 325 also contains the CP register 331 whose possible 16-bit representation is shown in Table E. This register 331 stores the binary representation of a CRC generator polynomial which configures the CRC register 330 to calculate a CRC checkword based upon the generator polynomial. The functionality furnished by the CRC and CP registers 330 and 331 provides the HDLC accelerator 220 with a programmable CRC generation capability.

formatted before loading the low order byte of the UD-HS register 305. When the low order byte of the UD-HS register 305 is loaded, only the number of bits specified in the UDBC bits will be formatted. These bits are used in "Receive" mode to indicate the number of bits missing from the byte being unformatted whenever a non-byte aligned frame flag or an abort flag is received. The value of the UDBC bit is loaded into the MB2-MB0 status bits whenever a frame flag or an abort flag is detected.

The IS register 315 also contains internal status bits that may govern the operation of the HDLC accelerator 220 or exist as conditions on when to set and clear certain HDLC accelerator status bits located in the UD-HS register 305. Bit 7 is the FFA bit which indicates that the FF address has been utilized for writing data to the low order byte of the UD-HS register 305. This bit allows data, typically a frame flag or

TABLE E

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| P15 | P14 | P13 | P12 | P11 | P10 | P9 | P8 | P7 | P6 | P5 | P4 | P3 | P2 | P1 | P0 |

Still referring to FIG. 4, one possible bit representation of the IS register 315 is shown in Table F. This register 315 provides the HDLC accelerator 220 with the ability to process partial data packets (i.e., bytes having <8 valid data bits and words having <16 valid data bits). Bits [3:0] contain the HDLC data bit count ("HDBC") bits which operate as a down counter that resets to "zero" whenever the HD register 310 as the input register is empty or as the output register is full. In "Send" mode, a partial formatted word can be read by first programming the HDBC bits with the number of bits to be read prior to reading the HD register 310. When the HD register 310 is read, only the number of bits specified in an abort flag, to directly propagate to the HD register 310 from the low order byte of the UD-HS register 305 and bypass the HDLC formatter circuit 320 and the CRC generation circuit 325 such that zero insertion and CRC generation are prevented from being performed upon the data, respectively.

Bit 8 is the abort flag detected ("ABRDET") bit which indicates that an abort flag has been detected in the HDLC formatter circuit 320 when unformatting a data packet in "Receive" mode. Bit 9 is the corresponding frame flag detected ("FRMDET") bit which indicates that a frame flag has been detected under the same conditions.

Bits [14:10] are not used, and are reserved for future compatibility. Bit 15, however, is the write IS register ("WISR") enable which, when set to a logic "1", allows the entire IS register 315 to be written with data. Otherwise, data will only be written to the HDBC bits. Since some applications require frequent formatting and unformatting of partial words, the WISR enable prevents unnecessary read-modify-write modify-write instructions on the IS register 315 in assembly code and allows programming the HDBC bits without concern of overwriting the other bit locations of the IS register 315. The WISR enable will read as a logic "1" so that a full IS register 315 restore can occur when switching between "Send" and "Receive" modes.

The FS register 321 is preferably a 16-bit register located in the HDLC formatter circuit 320 of FIG. 4 and a preferable bit representation is shown in Table G. In "Send" mode, this register 321 contains those data bits of the serial bit stream that are being tested for zero insertion. In "Receive" mode, the contained data bits are tested for zero deletion as well as for detection of frame and abort flags.

least significant byte first, via the low order byte of the UD-HS register 305. This allows the CRC checkword to be properly formatted for HDLC frame inclusion.

Lastly, the processing unit writes another frame flag to the low order byte of the UD-HS register 305 via the FF address. This indicates the end of the HDLC frame.

To unformat data, the HDLC accelerator 220 undergoes similar preparation as in "Send" mode except a logic "1" must be written to the SRM bit in the UD-HS register 305 to place the HDLC accelerator 220 in "Receive" mode. Thereafter, data received from the AFE interface is transmitted by the processing unit to the HD register 310 via the HD address. By asserting the SRM bit, the first and third multiplexers 335 and 345 are selected so that a 16-bit data packet placed in HD register 310 is shifted into the HDLC formatter circuit 320. In response, the HDLC formatter circuit 320 unformats the data and transmits the unformatted data to the second multiplexer 340 which, in turn, transmits that data to the low order byte of the UD-HS register 305. The unformatted data can then be read out of the UD-HS

TABLE G

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| F15 | F14 | F13 | F12 | F11 | F10 | F9 | F8 | F7 | F6 | F5 | F4 | F3 | F2 | F1 | F0 |

To discuss the operations of the HDLC accelerator 220 in more detail, it is necessary to continue to refer to FIG. 4. In order to format data, the HDLC accelerator 220 must first be placed in "Send" mode by writing a logic "0" into the SRM bit of the UD-HS register 305. Also, the CRC generation circuit 325 must be initialized by loading a 16-bit start value, called a CRC "seed", and a 16-bit CRC generator polynomial into the CRC register 330 and the CP register 331, respectively. A frame flag is then written to the low order byte of the UD-HS register 305 via the FF address by the processing unit. This frame flag indicates the beginning of an HDLC frame. The FF address automatically asserts the FFA bit of the IS register 315 which, along with the logic "0" in the SRM bit, causes the frame flag to directly propagate through the first and second multiplexers 335 and 340 and into the HD register 310.

Afterwards, the processing unit retrieves data to be formatted from the bus interface and writes it in data packets, preferably of single byte increments, into the low order byte of the UD-HS register 305 via the UD address. Writing to this address automatically de-asserts the FFA bit to a logic "0". The logic "0" in the SRM bit causes the first multiplexer 335 to apply the data to be formatted to the HDLC formatter circuit 320 which formats the data in accordance with the HDLC protocol. The formatted data is then applied through the second multiplexer 340 into the HD register 310. Once in the HD register 310, the formatted data may be retrieved by the processing unit for transmission to the AFE interface 210 of FIG. 3.

Additionally, the logic "0" in the SRM bit causes the data in the low order byte of the UD-HS register 305 to be applied through the third multiplexer 345 to the CRC generation circuit 325, more particularly the CRC register 330. The CRC register 330 uses the CRC generator polynomial stored in the CP register 331 to calculate a CRC checkword that is constantly updated when new information is formatted. When all the data has been formatted, the processing unit reads the resulting 16-bit checkword located in the CRC register 330, takes its one's complement and writes it back into the HDLC accelerator 220 in two 8-bit data packets, register 305 by the processing unit one byte at a time. Additionally, the unformatted data is applied to the CRC register 330 through the third multiplexer 345. When the entire HDLC frame has been unformatted, the checkword generated can be read by the processing unit and compared to a known value associated with the CRC generator polynomial. If the CRC checkword matches this value, no error has occurred during transmission of the data.

If during the middle of a format operation it is desirable to perform an unformat operation, the present state of the HDLC accelerator 220 can be saved by reading and storing all the values of each register. An unformat operation can then be started in the normal manner described above and once completed, the state of the HDLC accelerator 220 during the format operation restored, and the original format operation completed. The same applies for performing a format operation during the middle of an unformat operation. Thus, the same register set can be used for both formatting and unformatting which also provided mid-operation change of function.

Additionally, when either in "Send" mode or "Receive" mode, the HDLC accelerator 220 indicates it is ready to receive data by asserting the IBE bit (bit 13 of the UD-HS register), or that it is ready to have data read from it by asserting the OBF bit (bit 12 of the UD-HS register). The processing unit must check the status of these bits to determine when a read or write is to be performed. This removes the responsibility of storing data and monitoring interrupts from the HDLC accelerator 220 allowing the HDLC accelerator 220 to be implemented with minimum circuitry and to remove the burden incurred by the processing unit to service interrupt routines.

Figure 5A:
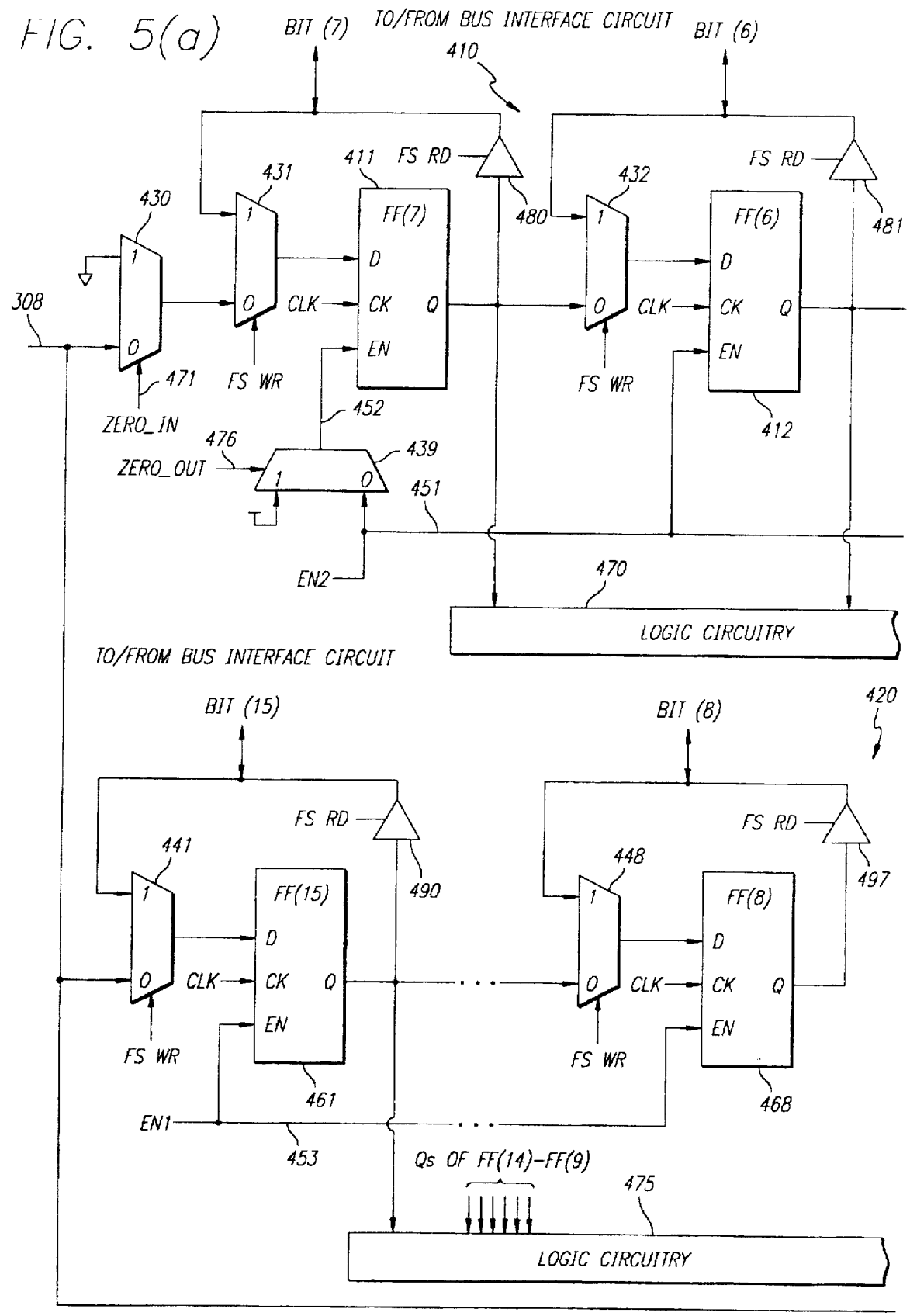
Figure 5C:
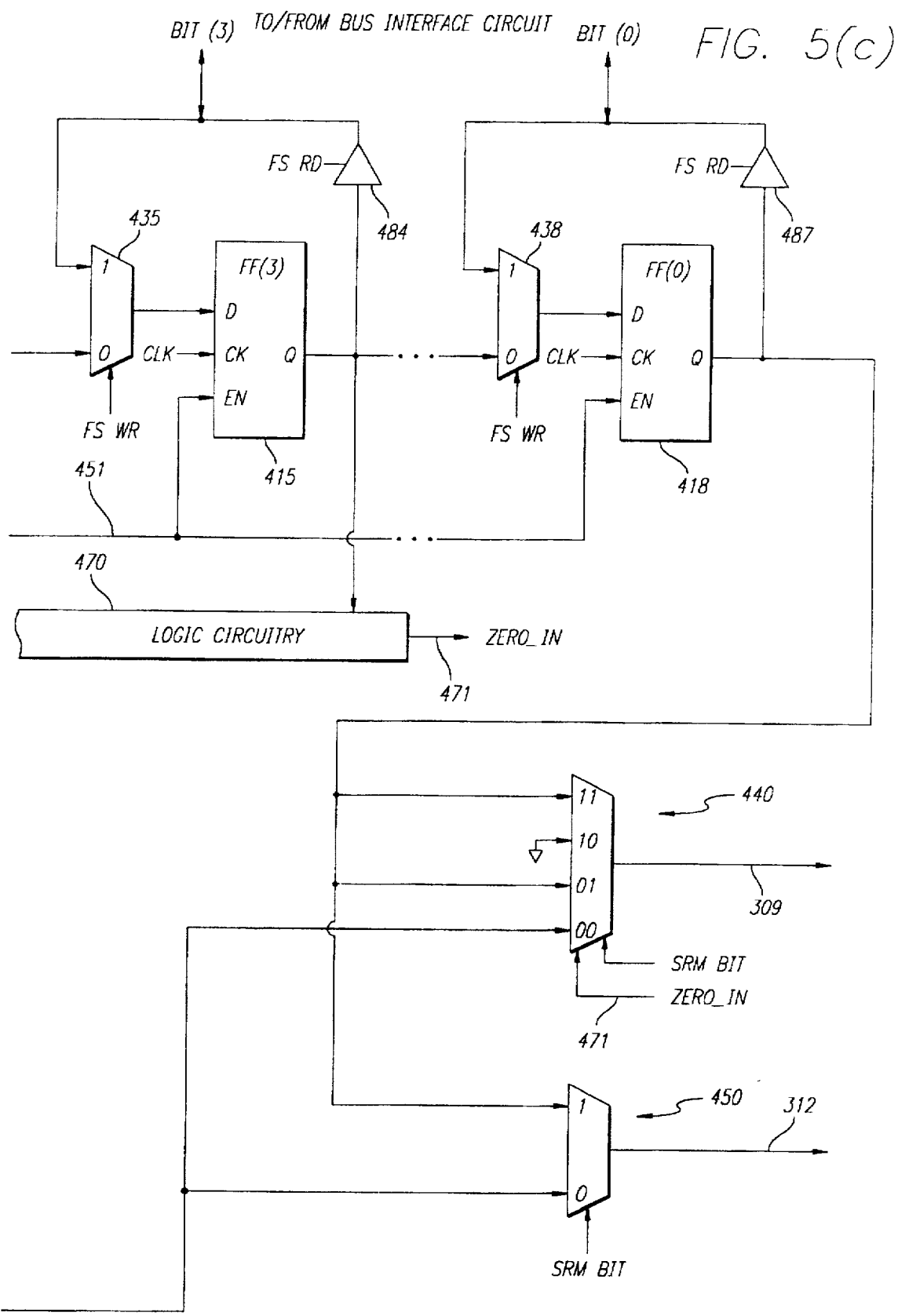

Referring now to FIGS. 5A–5C, an illustrative circuit diagram of the HDLC formatter circuit 320 is shown. The HDLC formatter circuit 320 may operate in "Send" mode in which it receives data serially from the third interconnect line 308 and formats the data by a well-known "zero insertion" technique into an outgoing HDLC frame. The HDLC formatter circuit 320 may further operate in "Receive" mode in which the HDLC formatter circuit 320 unformats data bits from an incoming HDLC frame by a well-known "zero deletion" technique. Moreover, the HDLC formatter circuit 320 is implemented to detect frame and abort flags within an HDLC frame in "Receive" mode thereby setting and clearing the Frame and Abort bits in the UD-HS register.

The HDLC formatter circuit 320 comprises an FS register 321 being preferably a 16-bit register divided into two 8-bit shift registers 410 and 420 each having eight D-type flip-flops 411–418 and 461–468 cascaded together to temporarily store the contents of bits [7:0] and bits [15:8] of the FS register 321. For clarity purposes, these shift registers 410 and 420 are hereinafter referred to as the "lower byte FS shift register" 410 and the "upper byte FS shift register" 420. Additionally, the HDLC formatter circuit 320 includes (i) combinatorial logic such as multiplexers 430–448 and 450 which are employed to influence data paths and (ii) logic circuitry 470 and 475 to assist in detecting whether zero insertion or zero deletion is needed and whether a frame flag or an abort flag has been inputted into the HDLC formatter circuit 320.

Data to be formatted or unformatted is serially transmitted through the third interconnect line 308 and is applied to multiplexers 430, 440, 441 and 450. If the SRM status bit from the UD-HS register is a logic "0" representing "Send" mode, the data to be formatted is shifted serially via the third interconnect line 308 through multiplexers 430 and 431 and into the lower byte FS shift register 410 via a first D-type flip-flop 411 clocked by signal CLK. The outputs of D-type flip-flops 411–415 are applied in parallel to the logic circuitry 470 which monitors whether zero insertion is needed upon detecting five consecutive data bits having logic "1". During "Send" mode, data does not enter the upper byte FS shift register 420 due to a disabled latch enable ("EN1") signal propagating through line 453 whereas a latch enable ("EN2") signal propagating through lines 451 and 452 is enabled for the lower byte FS shift register 410.

The SRM status bit is used for controlling multiplexers 440 and 450. While in "send" mode, if the logic circuitry 470 detects five consecutive logic "1s" in flip-flops 411–415, the logic circuitry 470 will assert a logic "1" on a ZERO_IN line 471 which controls the input selection for multiplexer 430 and is an additional control signal to multiplexer 440. This causes the multiplexer 440 to transmit a logic "0" through the fourth interconnect line 309 to be input into the HD register. Moreover, asserting the ZERO_IN line 471 further causes the multiplexer 430 to insert a logic "0" through multiplexer 431 and into the first D-type flip-flop 411 of the lower byte FS shift register 410 so that this register is updated with the same formatted data as that entering the HD register. In parallel, the logic "0" in the SRM status bit directs the serial bit stream from the third interconnect line 308 through multiplexer 450 and into the CRC register 330 (see FIG. 4) via the sixth interconnect line 312 where CRC generation is performed on the non-zero inserted data.

If the SRM status bit is asserted to represent that the HDLC formatter circuit 320 is in "Receive" mode, then data to be unformatted is shifted serially into both the lower and upper byte FS shift registers 410 and 420. Both halves of the FS register 320 are needed in "Receive" mode as the lower byte FS shift register 410 appropriately unformats the data while the upper byte FS shift register 420 maintains the original state of the data bit stream to avoid improper unformatting which may occur if the data being unformatted in the lower byte FS shift register 410 is used to detect for zero deletion. Therefore, the logic circuitry 480 monitors the upper byte FS shift register 420 to determine whether the data requires zero deletion. The ZERO_OUT line 476 is asserted by the logic circuitry 475 when the bit sequence of five consecutive logic "1s" followed by a logic "0" is detected. Since the ZERO_OUT line 476 is coupled to a select input of multiplexer 439, its assertion causes a logic "1" to be applied to an enable input of the first D-type flip-flop 411 through line 452. This allows the first D-type flip-flop 411 to be overwritten with a subsequent data bit thereby deleting the logic "0" that follows the five consecutive logic "1s".

Concurrently, the EN2 signal propagating through line 451 is disabled to prevent the other lower byte FS shift register flip-flops 412–418 from shifting data. The logic "1" in the SRM bit causes the unformatted data being output by the last D-type flip-flop 418 of the lower byte FS shift register 410 to propagate through multiplexer 440 and into the low order byte of the UD-HS register 305 (see FIG. 4) via the fourth interconnect line 309. The SRM status bit also selects multiplexer 450 to transmit this same data through the sixth interconnect line 312 to be input into the CRC register for the CRC generation.

If the logic circuitry 475 detects a frame flag (e.g., "10000001") or an abort flag (seven or more sequential logic "1s" e.g., "11111110"), the logic circuitry 475 asserts a FRAME_DETECT line 477 or an ABORT_DETECT line 478, respectively. These lines 477 and 478 set the FRMDET and ABRDET internal status bits of the IS register, respectively. The FRMDET and ABRDET internal status bits serve as conditions for setting and clearing certain HDLC accelerator status bits, most notably the Frame and Abort status bits, located in the UD-HS register and regulate some HDLC accelerator operations.

The bit outputs of the lower and upper byte FS shift registers 410 and 420 are applied to the bus interface circuit so that the present state of the HDLC formatter circuit 320 may be stored or restored when switching between "Send" and "Receive" modes. Storing the state of the HDLC formatter circuit 320 is achieved by asserting an FS Read ("FS RD") signal which enables drivers 480–487 and 490–497 to transmit the bit outputs of the D-type flip-flops 411–418 and 461–468, formally the lower and upper FS shift registers 410 and 420, to the bus interface circuit. Restoring the state is achieved by asserting an FS Write ("FS WR") signal which selects multiplexers 431–438 and 441–448 to transmit the data from the bus interface circuit into the D-type flip-flops 411–418 and 461–468 of the lower and upper FS shift registers 410 and 420.

Figure 6A:
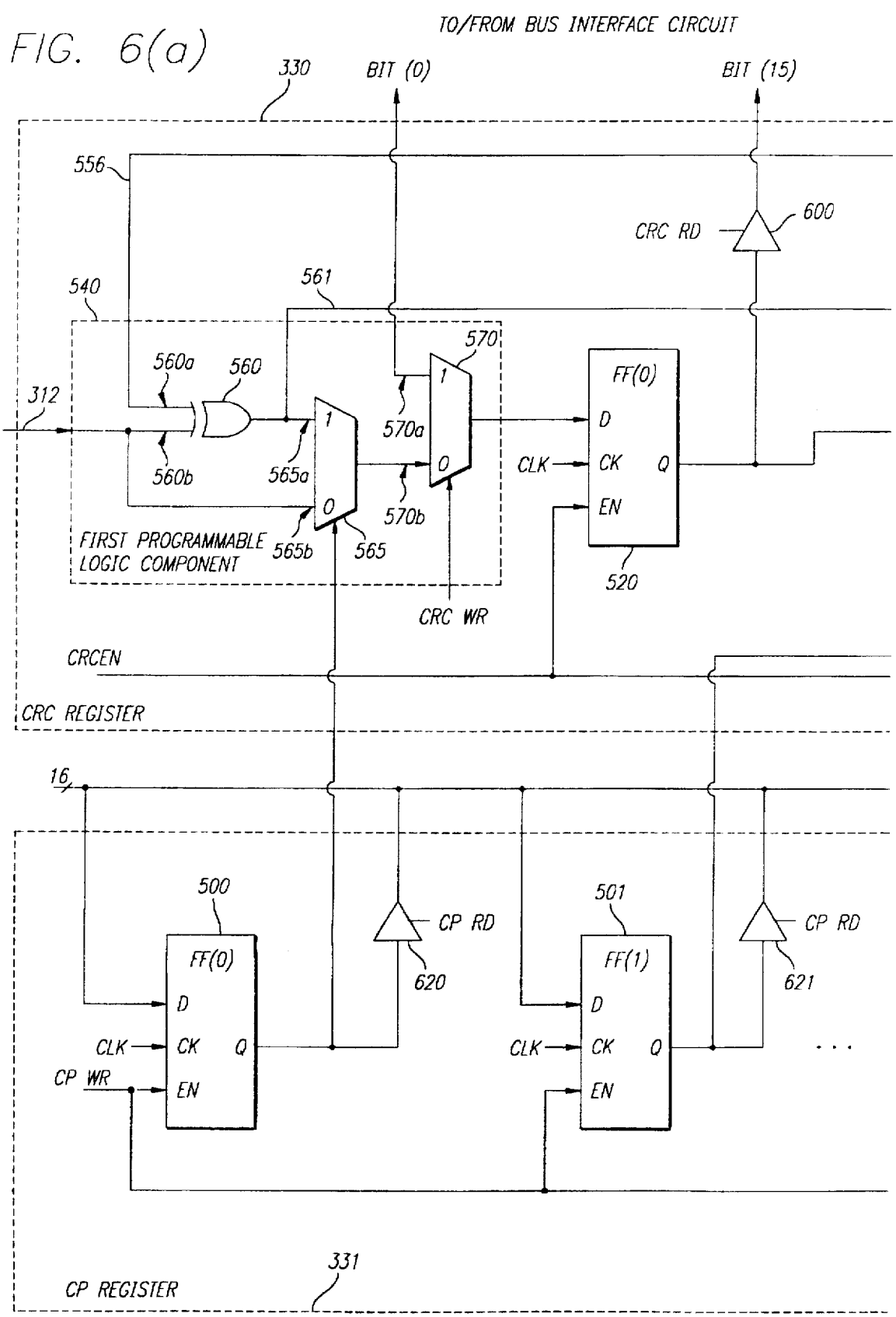
FIGS. 6A–6B are block diagrams collectively illustrating one embodiment of the CRC generation circuit of FIG. 4.
Figure 6B:
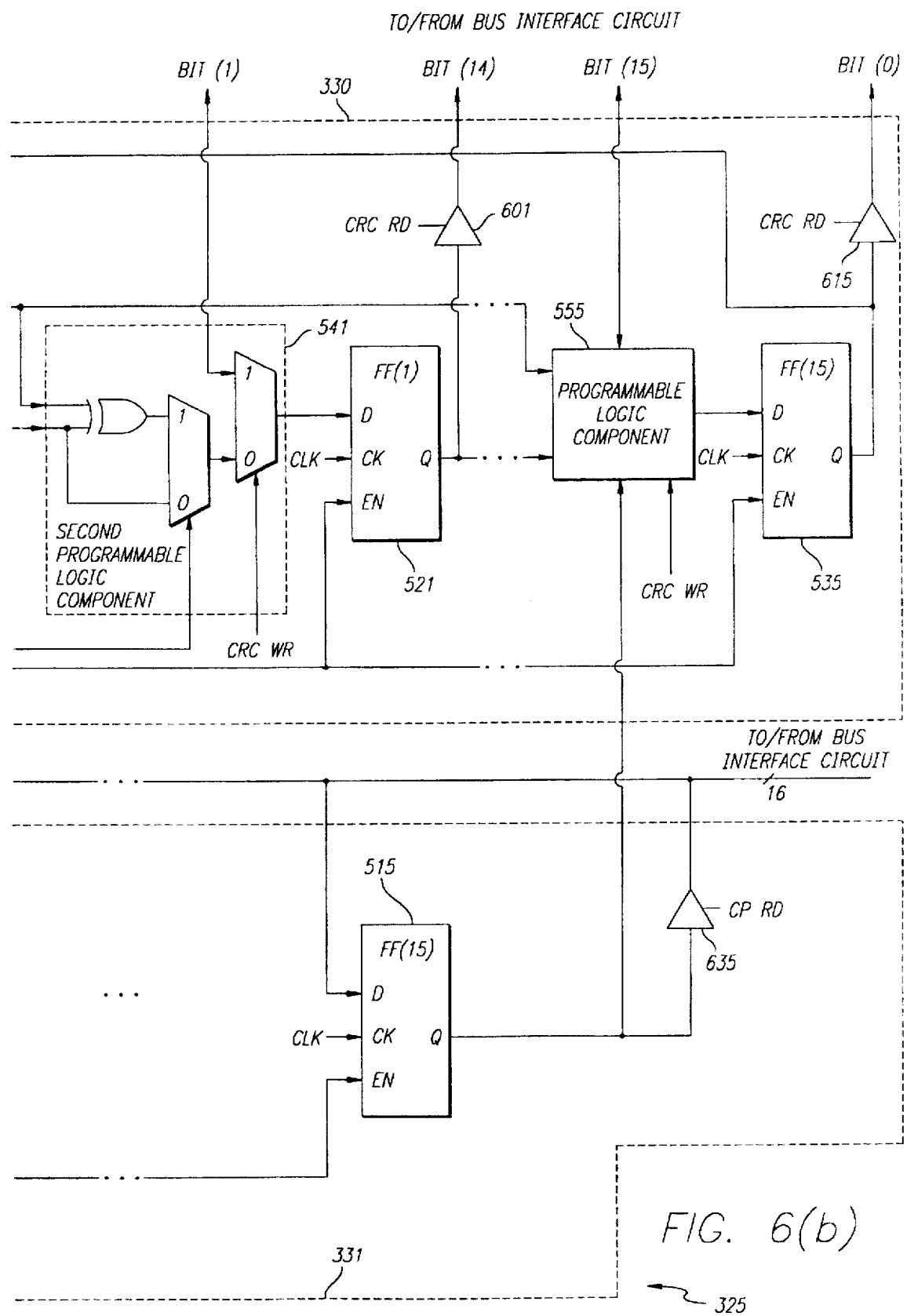

Referring to FIGS. 6A and 6B, a preferred embodiment of the CRC generation circuit 325 including the CRC register 330 and the CP register 331 of FIG. 4 is shown, wherein both the CRC and CP registers 330 and 331 may be of any chosen bit length. The CRC register 330 is a hardware implementation of the CRC generation algorithm where it receives a serial bit stream of data and calculates a CRC checkword based upon a CRC generator polynomial stored in the CP register 331. In this preferred embodiment, the CRC register 330 is a 16-bit register comprising 16 D-type flip-flops 520–535 with input of a first flip-flop 520 being coupled to a first programmable logic component 540 and inputs of the remaining flip-flops 521–535 being coupled to a second programmable logic component 541–555. Each of the programmable logic components 540–555 includes a dual-input exclusive-OR ("XOR") gate 560, a first dual-input multiplexer 565 and a second dual-input multiplexer 570.

The HDLC formatter circuit 320 of FIGS. 5A–5C serially transmits data bits into the programmable logic component 540 through interconnect line 312. More specifically, the serial bit stream is input into a second input 560b of the XOR gate 560 whose output is coupled to a first input 565a of the first multiplexer 565. A second input 565b of the first multiplexer 565 directly receives the serial bit stream as well. The output of the first multiplexer 565 is coupled to a second input 570b of a second multiplexer 570 which also receives data bit "0" from the bus interface circuit into a first input 570a. This allows data loading from the bus 225 of FIG. 3.

The second multiplexer 570 transmits data into a first D-type flip-flop 520 of the CRC register 330 clocked by signal CLK and enabled by signal CRCEN for serial transmission of its output bit through programmable logic component 541 and into the next D-type flip-flop 521. The XOR gate 560 further receives as input into a first input 560a the output bit of the last D-type flip-flop 535 through a feedback interconnect line 556. The XOR gate 560 outputs a resulting XOR signal through an output line 561 coupled to the first input 565a of the first multiplexer 565 as to well as each XOR gate of the remaining programmable logic components 541–555. Such configuration is particular only to the first programmable logic component 540 and no other subsequent programmable logic components 541–555 as clearly shown in a second programmable logic component 541.

As shown, the CP register 331 is a 16-bit register comprising 16 D-type flip-flops 500–515 and is configured to operate in parallel with the CRC register 330, although the CP register 331 may be of any bit length. The CP register 331 is primarily responsible for storing the CRC generator polynomial which enables the appropriate individual feedback paths within the CRC register 330 allowing a CRC checkword to be generated in accordance with the chosen generator polynomial. The first multiplexer 565 of each of the programmable logic components 540–555 of the CRC register 330 is controlled by its corresponding flip-flop 500–515, respectively, in the CP register 331. This allows a CRC register flip-flop to either receive the output bit of the previous CRC register flip-flop or data from the XOR gate 560. An exception exists, however, for the first D-type flip-flop 520 of the CRC register 330 such that it will receive as a possible direct input the serial bit stream, as discussed above, as opposed to the output bit of the previous CRC register flip-flop.

As an example, the CRC-CCITT generator polynomial $X^{16}+X^{12}+X^5+1$ is a common industry standard whose equivalent binary form is, from least significant bit ("LSB") -to-most significant bit ("MSB"), "1000 0100 0000 1000". When this binary value is stored in the CP register 331, the appropriate flip-flops associated with the first, fifth and twelfth bits, namely, flip-flops 500, 504 and 511, will retain an output bit of logic "1". These flip-flops in turn select the first multiplexer 565 in the programmable logic components 540, 545 and 552 to allow the output data from the corresponding XOR gate to propagate to the second multiplexer 570. The first multiplexer 565 in the remaining programmable logic components propagates the output bit of the previous CRC register flip-flop in response to the logic "0s" stored in the remaining CP register flip-flops.

Similar to the FS register 321, the bit outputs of the CRC register 330 and CP register 331 are applied to the bus interface circuit so that the present state of the CRC generation circuit 325 may be stored or restored when switching between "Send" and "Receive" modes. Unlike the other registers in the HDLC accelerator, however, the CRC register 330 is written and read bit reversed such that the high order bit is read into the low order line of the bus interface circuit and vice versa. This bit reversal appropriately orders the CRC checkword for inclusion into the HDLC frame such that CRC bit 15 will be transmitted first. Storing the state of the CRC register 330 is achieved by asserting a CRC Read ("CRC RD") signal which enables drivers 600–615 to transmit the bit outputs of flip-flops 520–535 to the bus interface circuit. Restoring the state is achieved by asserting a CRC Write ("CRC WR") signal which selects the second multiplexer 570 in the programmable logic components 540–555 to transmit the data from the bus interface circuit into the CRC register's flip-flops. The CP register 331 is similarly stored and restored, asserting instead a CP Read ("CP RD") signal to enable drivers 620–635 to store the contents of the CP register 331 and asserting a CP Write ("CP WR") signal to enable flip-flops 500–515 to restore the contents of the CP register 335.

Thus, a status bit controlled HDLC accelerator having a fully programmable CRC generation circuit, a partial data packet formatting/unformatting capability and a dual-mode register set has been described. To those reasonably well skilled in the art, various alternative embodiments of the invention will be apparent. The example described above is merely for the purposes of illustration and should not be taken as limiting the scope of the invention.

What is claimed is:

1. Operating in one of a first mode and second mode, an integrated circuit device performing high level data link control (HDLC) operations comprising:
    a dual-mode register set including
        a first storage element,
        a second storage element, and
        an HDLC formatter circuit alternatively coupled to said first and second storage elements through a data line, said HDLC formatter circuit formats a first bit stream from the first storage element during the first mode and unformats a second bit stream from the second storage element during the second mode; and
    a bus interface unit coupled to said dual-mode register set, said bus interface unit at least enables data to be written into and read from the first and second storage elements.

2. The integrated circuit device according to claim 1, wherein during the second mode, said first storage element contains a first data packet and serially outputs said first data packet as the first bit stream during the first mode.

3. The integrated circuit device according to claim 2, wherein said first element includes a plurality of status bits, a first status bit of the plurality of status bits is used to select whether the integrated circuit device is to operate in one of said first and second modes.

4. The integrated circuit device according to claim 2, wherein the second storage element receives a HDLC frame and serially converts said HDLC frame into said second bit stream during the second mode.

5. The integrated circuit device according to claim 4, wherein during the second mode, said first storage element further contains an unformatted bit stream, equivalent to said second bit stream after being unformatted by said HDLC formatter circuit, and converts said unformatted bit stream into a packet identical in construction to said first data packet.

6. The integrated circuit device according to claim 4, wherein during the first mode, said second storage element further contains a formatted bit stream, equivalent to said first bit stream after being formatted by said HDLC formatter circuit, and converts said formatted first bit stream into a second data packet in accordance with HDLC protocol.

7. The integrated circuit device according to claim 2 further comprising a cyclic redundancy checkword (CRC) generation circuit coupled to said HDLC formatter circuit and said bus interface circuit, said CRC generation circuit calculates a CRC checkword used for detecting a transmission error of said first data packet.

8. The integrated circuit device according to claim 7, wherein said CRC generation circuit includes a CRC polynomial register that contains a binary representation of a CRC generator polynomial; and a CRC register that calculates said CRC checkword based on said CRC generator polynomial contained in said CRC polynomial register.

9. The integrated circuit device according to claim 8, wherein said CRC polynomial register is programmable.

10. The integrated circuit device according to claim 7 further comprising a third storage element coupled to said bus interface circuit, said third storage element enables said first data packet, being a first plurality of bits in length and having less than the first plurality of bits of valid data, to be formatted by said HDLC formatter circuit.

11. The integrated circuit device according to claim 10, wherein said third storage element enables said second data packet, being a second plurality of bits in length and having less than the second plurality of bits of valid data, to be unformatted by said HDLC formatter circuit.

12. The integrated circuit device according to claim 11, wherein said third storage element enables said first data packet during the first mode, and alternatively said second data packet during the second mode, to bypass processing by said HDLC formatter circuit and said CRC generation circuit, provided said first data packet and alternatively said second data packet has a predetermined bit pattern.

13. The integrated circuit device according to claim 1, wherein said HDLC formatter circuit includes a first shift register coupled to said data line, said first shift register receives as input (i) said first bit stream from said first storage element during the first mode and (ii) said second bit stream from said second storage element during the second mode;

a first logic circuit coupled to said first shift register, said first logic circuit monitors said first bit stream for a predetermined bit pattern and controls HDLC formatting of said first bit stream in order to transmit a formatted first bit stream to said second storage element;

a second shift register coupled to said data line, said second shift register receives as input said second bit stream from said second storage element during the second mode; and a second logic circuit coupled to said second shift register, said second logic circuit monitors said second bit stream for a specific bit pattern and controls HDLC unformatting of said second bit stream while propagating through said first shift register in order to transmit an unformatted second bit stream to said first storage element.

14. The integrated circuit device according to claim 13, wherein said second logic circuit further monitors said second bit stream for a second predetermined pattern being one from a group consisting of a frame flag and an abort flag.

15. Operating in one of a first mode and a second mode, an integrated circuit device performing high level data link control (HDLC) operations, comprising:

HDLC format means for operating in the first mode to format a first data packet in accordance with an HDLC protocol and alternatively for operating in the second mode to unformat a second data packet in accordance with the HDLC protocol, including first storage means for storing said first data packet and for serially outputting said first data packet as a first bit stream during the first mode, second storage means for storing an HDLC frame and for serially converting said HDLC frame into a second bit stream during the second mode, and a HDLC formatting means for formatting said first bit stream during the first mode and for unformatting said second bit stream during the second mode, said HDLC formatting means being alternatively coupled to said first storage means and said second storage means; and bus interface means for enabling a first data packet to be written to said first storage means and a second data packet to be read from said second storage means, said bus interface means being coupled to said first storage means, said second storage means, and said HDLC formatting means.

16. The integrated circuit device according to claim 15, wherein during the second mode, said first storage means further temporarily stores an unformatted bit stream, equivalent to said second bit stream after being unformatted by said HDLC formatting means, and converts said unformatted bit stream into a packet identical in construction to said first data packet.

17. The integrated circuit device according to claim 16, wherein during the first mode, said second storage means further temporarily stores a formatted bit stream, equivalent to said first bit stream after being formatted by said HDLC formatting means and converts said formatted bit stream into a packet identical in construction to said second data packet.

18. The integrated circuit device according to claim 15, wherein said HDLC formatting means includes first circuit means for monitoring said first bit stream to detect a predetermined bit pattern and for controlling HDLC formatting of said first bit stream in order to transmit a formatted first bit stream to said second storage means, said first circuit means being coupled to said data line; and second circuit means for monitoring said second bit stream for a specific bit pattern and for controlling HDLC unformatting of said second bit stream propagating through said first circuit means in order to transmit an unformatted second bit stream to said first storage means, said second circuit means being coupled to said data line and said first circuit means.

19. The integrated circuit device according to claim 18, wherein said first circuit means of said HDLC formatting means includes first shifting means for receiving as input said first bit stream from said first storage means during the first mode and said second bit stream from said second storage means during the second mode, said first shifting means including a plurality of flip-flops cascaded in series, said first shifting means being coupled to said data line;

combinatorial logic means for performing HDLC formatting; and first logic means for monitoring output terminals of a preselected number of said plurality of flip flops and for controlling said combinational logic means.

20. The integrated circuit device according to claim 18, wherein said first circuit means of said HDLC formatting means includes second shifting means for receiving as input said second bit stream from said second storage means during the second mode, said second shifting means including a plurality of flip-flops cascaded in series;

said combinatorial logic means for performing HDLC unformatting; and second logic means for monitoring output terminals of said plurality of flip flops and controlling said combinational logic means.

21. The integrated circuit device according to claim 15 further comprising cyclic redundancy checkword (CRC) generation means, for calculating a CRC checkword used for detecting a transmission error of an HDLC frame and for storing a binary representation of a CRC generator polynomial, said CRC generation means being coupled to said HDLC formatting means and said bus interface means.

22. The integrated circuit device according to claim 21 further comprising third storage means for enabling said first data packet, being "n" bits in length and having less than "n" bits of valid data, to be formatted by said HDLC formatting means, said third storage means being coupled to said bus interface means.

23. The integrated circuit device according to claim 22, wherein said third storage means further enables said second data packet, being "m" bits in length and having less than "m" bits of valid data, to be unformatted by said HDLC formatting means.

24. A signal processing system of a first computing source being able to support bi-directional communications between the first computing source and a second computing source remotely located from the first computing system, the signal processing system comprising:

a bus;

a bus interface coupled to said bus, said bus interface receives a first digital data packet to be encoded and alternatively outputs a second digital data packet after being decoded;

an analog front end interface coupled to said bus;

a processing unit coupled to said bus; and an high level data link control (HDLC) accelerator coupled to said bus, said HDLC accelerator including a dual-mode register set operating in a first mode to encode said first digital data packet into a first HDLC frame, and alternatively, operating in a second mode to decode said second digital data packet from a second HDLC frame, and an interface circuit coupled to said dual-mode register set, said interface circuit enables said first digital data packet to be written into said dual-mode register set and said second digital data packet to be read from said dual-mode register set.

25. A signal processing system of a first computing source being able to support bi-directional communications between the first computing source and a second computing source remotely located from the first computing system, said signal processing system comprising:

bus means for transmitting information;

bus interface means for receiving a first digital data packet to be encoded, and alternatively for outputting a second digital data packet after being decoded;

an analog front end interface coupled to said bust;

a processing unit coupled to said bus; and high level data link control (HDLC) accelerator means for encoding said first digital data packet and alternatively for decoding said second digital data packet, said HDLC accelerator means being coupled to said bus means and including dual-mode formatting means for operating in a first mode to encode said first digital data packet into a first HDLC frame and alternatively, for operating in a second mode to decode said second digital data packet from a second HDLC frame, and an interface circuit, coupled to said dual-mode formatting means, for enabling said first digital data packet to be written into said dual-mode register set and said second digital data packet to be read from said dual-mode formatting means.

26. A method performing high level data link control (HDLC) formatting and unformatting operations, the method comprising the steps of:

(1) performing said HDLC formatting operation on a first data packet during a first mode, said HDLC formatting operation includes the steps of:

temporarily storing said first data packet in a first storage element, serially shifting said first data packet as a first bit stream into an HDLC formatting circuit, formatting said first bit stream, and serially shifting said formatted first bit stream into a second storage element for subsequent inclusion in an HDLC frame; and (2) performing said HDLC unformatting operation on a second data packet during a second mode, said HDLC unformatting operation includes the steps of:

temporarily storing said second data packet in said second storage element, serially shifting said second data packet as a second bit stream into said HDLC formatting circuit, unformatting said second bit stream, and serially shifting said unformatted second bit stream into said first storage element for subsequent inclusion in an HDLC frame.

* * * * *

UNITED STATES PATENT AND TRADEMARK OFFICE
CERTIFICATE OF CORRECTION

PATENT NO. : 5,638,370
DATED : June 10, 1997
INVENTOR(S) : Seconi et al.

It is certified that error appears in the above-identified patent and that said Letters Patent is hereby corrected as shown below:

In column 5 at line 36 delete "asserting or deasserting asserting" and insert --asserting or deasserting--

In column 7 at line 11 delete "("CUD")" and insert --("UD")--

In column 11 at line 8 delete "modify-write"

Signed and Sealed this

Ninth Day of September, 1997

Attest:

BRUCE LEHMAN

*Attesting Officer*   *Commissioner of Patents and Trademarks*